US010995035B2

(12) United States Patent
Raj et al.

(10) Patent No.: US 10,995,035 B2
(45) Date of Patent: May 4, 2021

(54) METHOD OF FORMING A SINTERED COMPOUND AND COMPOUND FORMED USING THE METHOD

(71) Applicant: The Regents of the University of Colorado, Denver, CO (US)

(72) Inventors: Rishi Raj, Boulder, CO (US); Viviana Avila, Louisville, CO (US)

(73) Assignee: The Regents of the University of Colorado, Denver, CO (US)

( * ) Notice: Subject to any disclaimer, the term of this patent is extended or adjusted under 35 U.S.C. 154(b) by 95 days.

(21) Appl. No.: 16/136,043

(22) Filed: Sep. 19, 2018

(65) Prior Publication Data

US 2020/0087210 A1   Mar. 19, 2020

(51) Int. Cl.
*H01M 10/0562* (2010.01)
*C04B 35/48* (2006.01)

(52) U.S. Cl.
CPC ......... *C04B 35/48* (2013.01); *H01M 10/0562* (2013.01); *C04B 2235/3203* (2013.01); *C04B 2235/3227* (2013.01); *C04B 2235/3244* (2013.01); *C04B 2235/666* (2013.01); *H01M 2300/0077* (2013.01)

(58) Field of Classification Search
None
See application file for complete search history.

(56) References Cited

U.S. PATENT DOCUMENTS

| 8,940,220 | B2 | 1/2015 | Raj et al. | |
| 9,334,194 | B2 | 5/2016 | Raj et al. | |
| 2013/0105735 | A1* | 5/2013 | Rader | C09K 11/7792 |
| | | | | 252/301.4 R |
| 2014/0306381 | A1* | 10/2014 | Raj | C04B 35/645 |
| | | | | 264/414 |
| 2015/0200420 | A1* | 7/2015 | Holme | H01M 10/0585 |
| | | | | 429/322 |

OTHER PUBLICATIONS

Zhang et al. (Journal of Power Sources 268 '2014' 960-964). (Year: 2014).*
USPTO; Non-Final Office Action dated Jun. 29, 2020 in U.S. Appl. No. 16/136,063.
Clemenceau et al.: Flash sintering of Li-ion conducting ceramic in a few seconds at 850° C; Scripta Materialia 172 (2019) 1-5.
Avila et al.: Reactive flash sintering of powders of four constituents into a single phase of a complex oxide in a few seconds below 700° C; J Am Ceram Soc.; Jun. 2, 2019; 102:6443-6448.

* cited by examiner

*Primary Examiner* — Wojciech Haske
(74) *Attorney, Agent, or Firm* — Snell & Wilmer L.L.P.

(57) ABSTRACT

Methods of forming sintered compounds and compounds formed using the methods are disclosed. Exemplary methods include reactive flash sintering to form sintered compounds from two or more starting compounds. Various sintered compounds may be suitable for use as solid electrolytes in solid-state electrochemical cells and batteries.

17 Claims, 19 Drawing Sheets

METHOD OF FORMING A SINTERED COMPOUND AND COMPOUND FORMED USING THE METHOD

STATEMENT REGARDING FEDERALLY-SPONSORED RESEARCH OR DEVELOPMENT

This invention was made with government support under grant number DE-AR0000777 awarded by ARPA-E and grant number W911NF-16-1-0200 awarded by ARO. The government has certain rights in the invention.

CROSS-REFERENCE TO RELATED APPLICATIONS

This application is filed concurrently with U.S. application Ser. No. 16/136,054, entitled "FLASH-SINTERED COMPOSITE MATERIALS AND METHODS OF FORMING SAME," and filed Sep. 19, 2018, and U.S. application Ser. No. 16/136,063, entitled "STRUCTURE INCLUDING A THIN-FILM LAYER AND FLASH-SINTERING METHOD OF FORMING SAME," and filed Sep. 19, 2018, the contents of which are hereby incorporated herein by reference.

FIELD OF THE DISCLOSURE

The present disclosure generally relates to sintering techniques. More particularly, the disclosure relates to methods of flash sintering and to materials formed using flash sintering.

BACKGROUND OF THE DISCLOSURE

Electrochemical cells generally include an anode, a cathode, and an electrolyte, typically a liquid electrolyte. During discharge of an electrochemical cell, an oxidation-reduction reaction occurs, causing electrons to flow, through an external circuit, from the anode to the cathode, and cations are attracted from the anode to the cathode.

Batteries that include one or more electrochemical cells can be used to power a variety of devices, such as mobile phones, portable computers, other portable devices, electric or hybrid cars, as well as many other appliances. For many applications, it is desirous to use electrochemical cells with relatively low weight and relatively high energy density (energy that can be derived from a cell per unit volume of the cell) and/or relatively high specific energy density (energy that can be derived per unit weight of the cell or per unit weight of the active electrode material), so that desired energy can be supplied to a device using the cell, while minimizing the mass and/or volume of the cell.

Because of their high voltage and energy density, batteries that include a lithium metal anode have become a subject of much interest. However, such batteries, particularly when such batteries include a liquid electrolyte, can pose serious safety concerns.

Recently, solid state batteries have been proposed as an option to safely enable the use of lithium anodes in electrochemical cells. The use of solid-state electrolytes can have a further advantage of increasing the energy, power density, and lifetime of lithium-ion batteries.

Generally, the solid-state electrolytes desirably exhibit a high ionic conductivity and a wide stability window against lithium metal. Various garnet-type oxides, and particularly LLZO ($Li_7La_3Zr_2O_{12}$), are materials suitable for use as solid-state electrolytes.

LLZO is typically made by chemical-solution and solid-state reactions. Chemical-solution reactions, which include sol-gel and Pechini-type methods, have been widely employed. However, chemical reactions to form LLZO are complex and generally require wet processing, which can interact with the chemistry of the lithium compounds; such processes can also pose environmental issues, such as nitrogen oxide emissions, as well as variability in the chemistry of the electrolyte. Solid state reactions, on the other hand, generally require high temperatures and a long process time to achieve synthesis and densification of material. Although traditional solid state processes have been used to synthesize LLZO, such processes generally include time consuming milling and sintering steps, which limit scalability of the processes. Further, such processes typically use starting materials that are relatively complex to make and that are expensive. Accordingly, improved methods of forming sintered compounds, such as compound suitable for use as a solid-state electrolyte, are desired.

SUMMARY OF THE DISCLOSURE

This summary is provided to introduce a selection of concepts in a simplified form. These concepts are described in further detail in the detailed description of example embodiments of the disclosure below. This summary is not intended to necessarily identify key features or essential features of the claimed subject matter, nor is it intended to be used to limit the scope of the claimed subject matter.

Various embodiments of the present disclosure relate to methods of forming a sintered compound and to sintered compounds formed using such methods. While the ways in which various embodiments of the present disclosure address drawbacks of prior techniques for forming or attempting to form desired sintered materials are discussed in greater detail below, in general, various embodiments of the disclosure provide techniques to flash sinter materials using multiple compounds as starting materials for the flash sintering process. The flash sintering methods described herein can be performed using relatively inexpensive and/or easy to find starting materials, at relatively low temperatures, and in a relatively short time, compared to traditional sintering techniques.

In accordance with at least one embodiment of the disclosure, a method of forming a sintered compound includes the steps of providing a first compound comprising a first chemical composition, providing a second compound comprising a second chemical composition, providing a third compound comprising a third chemical composition, and flash sintering (e.g., reactive flash sintering, described in more detail below) the first compound, the second compound, and the third compound to form a single-phase sintered compound. In accordance with one or more aspects of these embodiments, the method further comprises providing a dopant; such a dopant can include lithium substitution compounds selected from the group of aluminum oxide, gallium oxide, iron oxide, etc., and/or zirconium substitution compounds selected from the group of niobium oxide, tantalum oxide, antimony oxide, titanium oxide, and the like. By way of particular examples, the dopant is selected from the group consisting of aluminum oxide, titanium oxide, tantalum oxide, vanadium oxide, yttrium oxide, and other oxides of transition metals and rare earth metals, and the like. One or more of all of the first, second, third, and fourth compounds can include or be a metal oxide, such as a single-metal oxide. By way of examples, the first compound can be or include lithium oxide, the second compound can be or include lanthanum oxide, the third compound can be or include zirconium oxide, and/or the fourth compound can be or include aluminum oxide.

In accordance with at least one additional embodiment of the disclosure, a sintered compound is formed according to the method of claim 1. The sintered compound can be a single-phase material comprising three or more metals. For example, the sintered compound can include 3-10, 4-10, or 4-6 metals.

In accordance with at least one additional embodiment of the disclosure, a method of forming a solid-state electrolyte includes the steps of providing a mixture comprising a first compound comprising a first chemical composition and a second compound comprising a second chemical composition, and flash sintering the mixture to form a solid-state electrolyte material. Exemplary aspects can include flash sintering three or more compounds, such as any of the compounds disclosed herein. By way of particular examples, the method can be used to form single-phase (e.g., cubic or tetragonal) Li7La3Zr2O12, which can optionally be doped with a dopant, such as a dopant described herein.

BRIEF DESCRIPTION OF THE DRAWING FIGURES

A more complete understanding of exemplary embodiments of the present disclosure can be derived by referring to the detailed description and claims when considered in connection with the following illustrative figures.

Figure 1:
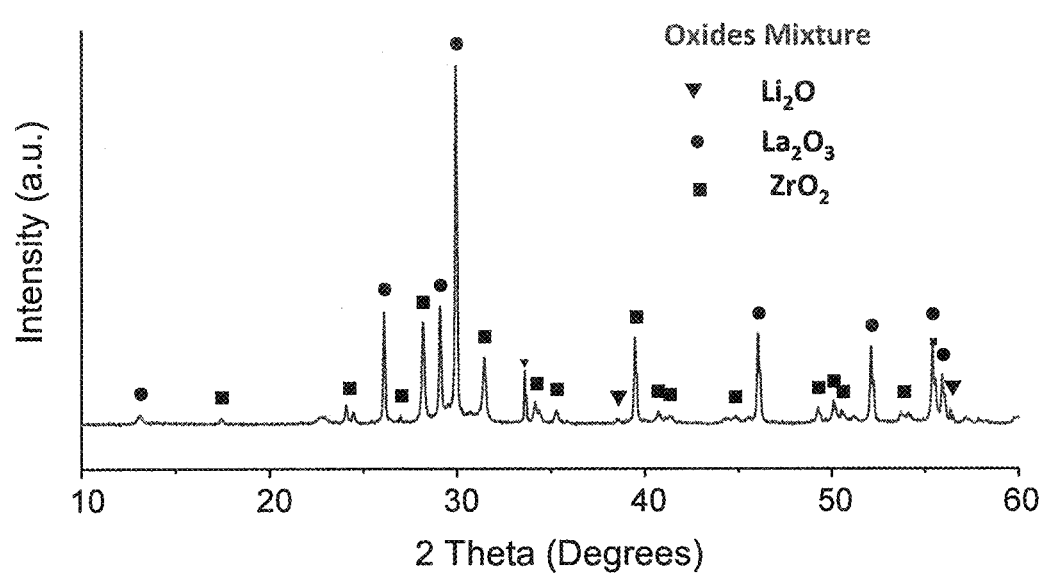
FIG. 1 illustrates X-ray diffraction information for a mixture of compounds in accordance with at least one embodiment of the disclosure.

It will be appreciated that elements in the figures are illustrated for simplicity and clarity and have not necessarily been drawn to scale. For example, the dimensions of some of the elements in the figures may be exaggerated relative to other elements to help to improve the understanding of illustrated embodiments of the present disclosure.

DETAILED DESCRIPTION OF EXEMPLARY EMBODIMENTS OF THE DISCLOSURE

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

The present disclosure generally relates to methods of forming a sintered compound. Exemplary methods include forming a sintered compound from two or more—e.g., three or more, compounds. The compounds can include, for example, metal (e.g., single-metal) oxides.

As set forth in more detail below, methods described herein can be used to form materials suitable for solid-state electrolytes for use in, for example, lithium-based solid-state electrochemical cells and batteries. Heretofore, a main technical barrier in the implementation of suitable solid-state electrolytes for lithium-based electrochemical cells has been a suitable method of forming such materials. In the case of conventional sintering, for example, where the starting material is typically a powder of the electrolyte material, the relatively high mobility of lithium in the starting material creates difficulties in sintering, where solid-state diffusion of the slowest moving species (e.g., La, or Zr in LLZO) requires high temperatures and long durations to achieve sintering. Significant loss of lithium can occur in these cases. Doping of the compounds with additional oxides, such as alumina, can be even more unpredictable, because of the compositional and phase instability at high temperatures.

The fast diffusion of Li+ at room temperature, which makes LLZO attractive as a solid state electrolyte, becomes an impediment during conventional sintering: lithium can escape into the atmosphere, and can react with oxygen to form Li2O in air, with obvious loss of electrochemical performance.

Conventional sintering of LLZO has typically been carried out at temperatures of 1000° C.-1230° C. range for up to 36 h. Hot-pressing, within a die in an argon atmosphere has been shown to reduce the sintering temperature to the 1000° C.-1150° C. range and sintering time to about an hour at an applied uniaxial pressure of 20-62 MPa.

The application of spark plasma sintering, where powders are placed and pressed within a graphite die, and where the graphite die is heated directly with electrical power, can produce sintering in 10 min at 950° C. and a pressure of 50 MPa in vacuum. However, the reducing atmosphere of the graphite can have an adverse influence on ionic conductivity of the ceramic.

Exemplary methods described herein can be used to form compounds, such as doped or undoped lithium lanthanum zirconate (LLZO) compounds (e.g., $Li_7La_3Zr_2O_{12}$), other solid electrolyte compounds, and yet additional compounds, made from constituent powders (e.g., single-metal oxides—e.g., lithium oxide, lanthanum oxide, and zirconium oxide with or without an additional dopant, such as aluminum oxide and/or titanium oxide, or other dopants as described herein) in a single step by a flash sintering process. In this case, synthesis, phase transformation and sintering can be accomplished in the same step, referred to as reactive flash sintering. Exemplary reactive flash sintering processes, e.g., to form doped or undoped LLZO, can occur by applying electrical fields (e.g., 30 V $cm^{-1}$, 40 V $cm^{-1}$, 50 V $cm^{-1}$, or about 30 to about 500 V $cm^{-1}$) at furnace temperatures that are below 1300° C., 1000° C., 850° C., 700° C. or below 650° C. (e.g., from about 500° C. to about 700° C., or about 300° C. to about 650° C., or about 1000° C. to about 1300° C.). The process can run for a few (e.g., 0.1 to about 10, about 1 to about 5, or about 1.5 to about 4) seconds, which helps to retain the compositional fidelity of the sintered material. Flash sintering can be performed in a variety of ways, including applying a voltage to a sample in isothermal furnace and switching to current control upon the incidence of flash, applying a voltage and heating the furnace at increasing temperature (e.g., increasing temperature at or approximate (e.g., plus or minus about ten percent) at a constant rate) until the onset of the flash, and applying (e.g., proximately isothermal) furnace temperature and increasing the current—e.g., increasing current at or approximately at a constant rate from the very start, without using voltage control. In the latter case, current rates can be varied from, for example, about 50 mA $min^{-1}$ to 5000 mA $min^{-1}$, or about 100 mA $mm^{-2}$. The following comparisons of current rate to the voltage-to-current experiments are noted (i) in both instances the onset of the flash is signaled by an unusual rise in conductivity; however if the power supply remains in the current control mode, the increase in conductivity is manifested by a drop in the voltage generated across the specimen, (ii) the black body radiation model is modified to include the energy absorbed in specific heat, in order to determine the time dependent change in temperature as the current is increased—this correction is particularly significant at the very high current rates, (iii) sintering occurs continuously, reaching full density, in most or all instances, when the current density reaches ~100 mA $mm^{-2}$, and (iv) it is suggested that the current rate experiments yield fine-grained microstructure across the entire gage section of the dog-bone specimen, presumably because the highly transient conditions of voltage-to-current flash experiments are sidestepped. Exemplary apparatus and techniques for flash sintering other materials are disclosed in U.S. Pat. No. 8,940,220, issued on Jan. 27, 2015, in the name of Raj et al. and U.S. Pat. No. 9,334,194, issued on May 10, 2016, in the name of Raj et al., the contents of both of which are hereby incorporated herein by reference to the extent such contents do not conflict with the present disclosure.

Cubic and tetragonal phases of LLZO compounds can be prepared using these methods. The cubic phase is shown to have a specific conductivity of 0.15 mS $cm^{-1}$. This method enables a new field for the synthesis of ceramic compounds, which can be doped in different ways, to develop new materials with desired properties, for ceramic electrolytes, cathodes for lithium ion batteries, and other applications. Complex oxides with quaternary and even higher level compositions can be prepared by reactive flash sintering using methods described herein.

Flash sintering generally and more particularly reactive flash sintering includes three control parameters: applied electric field (V $cm^{-1}$), applied current density (mA $mm^{-2}$), and furnace temperature (° C.). Generally, either the field or the current density can be controlled at one time, but not both. It is thought that the onset of the flash sintering generally depends on the electric field and the furnace temperature. The onset of flash sintering can be signaled by a noticeable/abrupt rise in conductivity. As the current rises, the power supply can be (e.g., automatically) switched to current control mode, when the current reaches a prescribed limit.

As noted above, flash sintering can be carried out in various modes. For example, an applied field can applied at the start of a process, and the furnace can heated (e.g., at a constant rate or near constant rate (e.g., within plus or minus ten percent)) until the onset of the flash sintering. The power supply can then switched to current control for a period of time to densify the sample. The method can then be terminated. In accordance with a second mode, a furnace can be held at or near (e.g., within plus or minus ten percent) constant temperature and an applied electric field can be applied (e.g., as a step function, linear, or other pattern). The flash sintering initiates after an incubation period, defined as the period between the application of the electric field as a step function and the onset of the flash event. The power supply can switch (e.g., automatically) to current control mode, and the specimen can be held in this state until desired densification is reached. The sintering rate has been shown to depend on the current limit, with a higher current limit increasing the final density.

Figure 10:
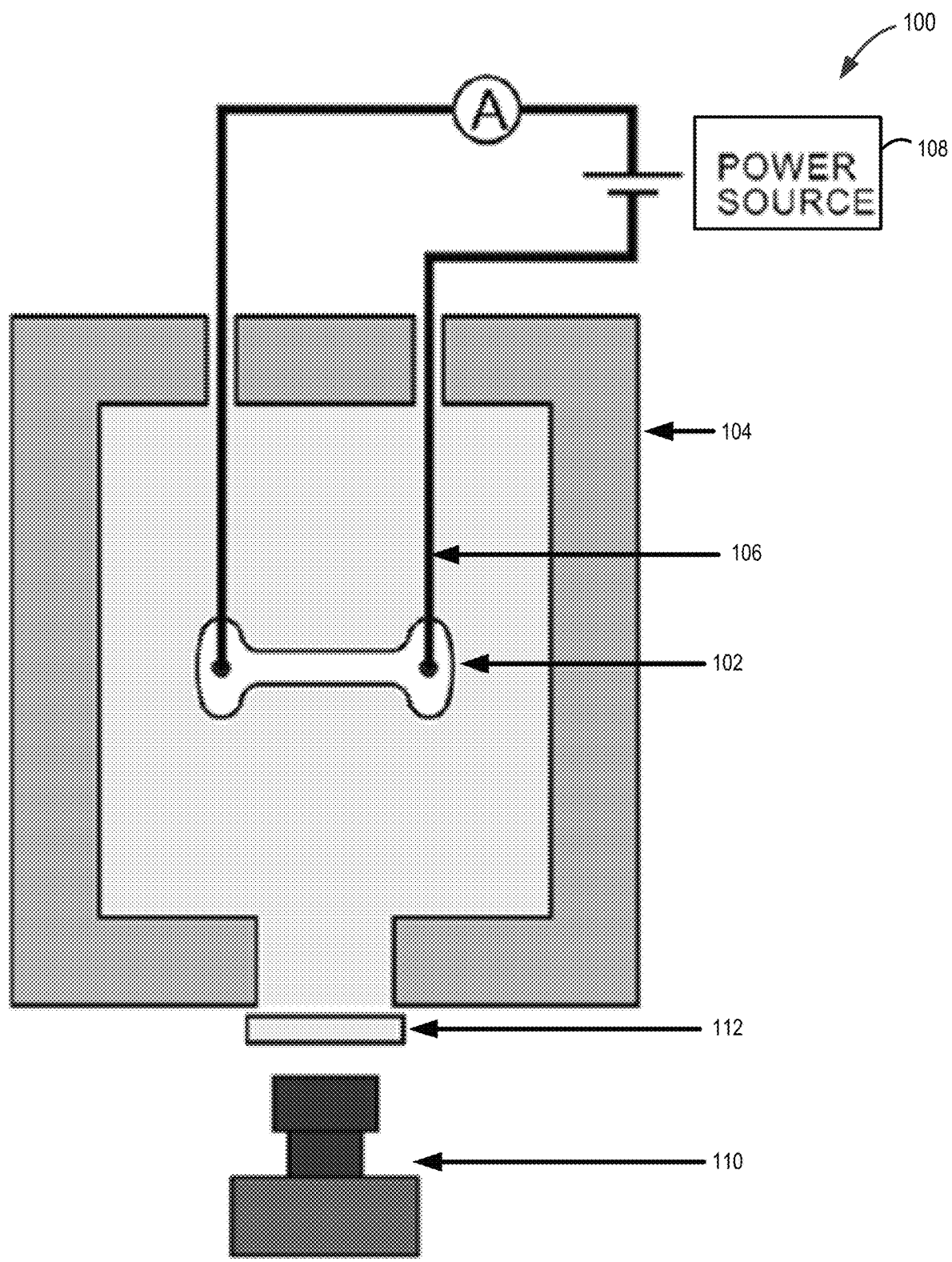
FIG. 10 illustrates an apparatus suitable for performing the methods and/or for forming the sintered compounds as disclosed herein.

FIG. 10 illustrates an apparatus for forming sintered materials. In the illustrated examples, dog-bone specimen 102 is hung within a conventional furnace 104 with wires 106 (e.g., made from a Kanthal since platinum was seen to react with LLZO) that carry electrical field and/or current from one or more power supplies 108. The shrinkage in the specimen is measured with a camera 110, e.g., at a rate of 10 frames per second, optionally using an optical filter 112. Power supply 108 can be or include a KL series; Glassman High Voltage, High Bridge, N.J. power supply. The current flowing through the specimen can be measured with a digital multimeter (Keithley Model 2000; Keithley, Cleveland, Ohio). Power supply 108 can be capable of switching from voltage to current control within, for example, 50 mS or less. Camera 110 can be or include a CCD camera (DMK Model; The Imaging Source, Charlotte, N.C.) to, for example record a change in the sample dimensions through one or a series of optical filters 112, which can then be translated into shrinkage strain.

The (true) linear shrinkage strain, ε, was calculated from $$\varepsilon = \ell n \frac{\ell}{\ell_o} \quad (1)$$

where $l_o$ is the initial gage length and l is the time-dependent gage length as the specimen sinters. The density, ρ, was calculated from the linear shrinkage using $$\rho = \rho_g e^{-3\varepsilon} \quad (2)$$

where ρg is the green density. Matlab software was employed for controlling the process, data analysis and presentation of the flash sintering curves.

Specific Examples

The specific examples provided below illustrate reactive flash sintering methods for forming doped and undoped LLZO. However, unless otherwise noted, the invention is not limited to such specific examples. Various examples illustrate methods of forming garnet LLZO made from powders of lithium oxide, lanthanum oxide, and zirconium oxide powders. The powders can be further mixed with a dopant (e.g., aluminum oxide and/or titanium oxide) to produce the cubic phase of LLZO. The cubic phase of LLZO exhibits relatively high ionic conductivity for $Li^+$.

Commercially available powders of oxides were used. Lithium oxide powder, Li2O (97%) and zirconium(IV) oxide powder, ZrO2 (99%) were purchased from Sigma Aldrich, and lanthanum(III) oxide, La2O3 (99.9%) was purchased from Alfa Aesar. These powders were stoichiometrically mixed. The molar ratio of Li:La:Zr of 7:3:4 was used for the tetragonal phase of LLZO (e.g., 3.5 Li2O, 1.5 La2O3, 2 ZrO2). The cubic phase of LLZO was made by adding a dopant, Al2O3, to the mixture of compounds prior to sintering. The aluminum oxide, Al2O3, was purchased from High Purity Alumina (AKP-30). The molar content of alumina was about 0.35. With this substitution, the target composition for the cubic phase was Li5.95Al0.35La3Zr2O12. The respective weights for the reactants was then calculated (e.g., 2.975 Li2O, 0.175 Al2O3, 1.5 La2O3, 2 ZrO2).

The powders were mixed by hand in a glovebox. Next they were placed in a plastic bottle with yttrium stabilized zirconia balls and sealed under argon for further mixing in a vibrator mill for one hour. The mixture of oxides was then pressed into a dog bone shape, with gage dimensions of about 15 mm, 3.5 mm and about 1 mm for reactive flash methods, as described below. All specimens were of similar dimensions and exhibited a green density between about 50% and about 55%.

The XRD pattern of the individual commercial oxides was compared to the XRD pattern of the mixture to establish the purity of the reactants. We wished to confirm that the starting powder was lithium-oxide and not lithium-carbonate. Special precautions (inert environment and limited exposure to air) were taken to preserve $Li_2O$. The phase fidelity of the powder mixture was confirmed by X-ray diffraction. The crystal-structure analysis was carried out by diffractometry using a Bruker-D2 Phaser X-ray diffractometer (CuK, 30 kV, 10 mA). The X-ray diffraction pattern from the powder mixtures is illustrated in FIG. 1, and is consistent with the structure of the simple oxide constituents.

The reactive flash sintering compounds were formed using a constant heating rate mode ($10°$ C. $min^{-1}$) in ambient air. Details of all processes are summarized in Table 1.

TABLE 1

Summary of reactive flash sintering processes at constant heating rate.

| Constant Heating Rate Process 10° C. min−1 | Tetragonal-LLZO | | | | | | Cubic-LLZO | |
| --- | --- | --- | --- | --- | --- | --- | --- | --- |
| | Variable Field, Constant Current | | | Constant Field, Variable Current | | | Variable Field, Variable Current | |
| Electric field V cm−1 | 30 | 40 | 50 | | 40 | | 40 | 50 |
| Current Density mA mm−2 | | 180 | | 160 | 180 | 200 | 200 | 200 |
| Flash Onset Temperature ° C. | 435 | 445 | 455 | | 450 | | 450 | 680 |
| Final Density | | | | 76%-85% | | | 85% | 86% |

For tetragonal LLZO two sets of processes were done. In Set I, the field was varied, 30 Vcm−1, 40 Vcm−1 and 50 Vcm−1, while the current limit was held constant 180 mA mm−2. In Set II, the field was held constant at 40 V cm−1, and the current density was varied from 160 mA mm−2, 180 mA mm−2 to 200 mA mm−2.

Figure 2:
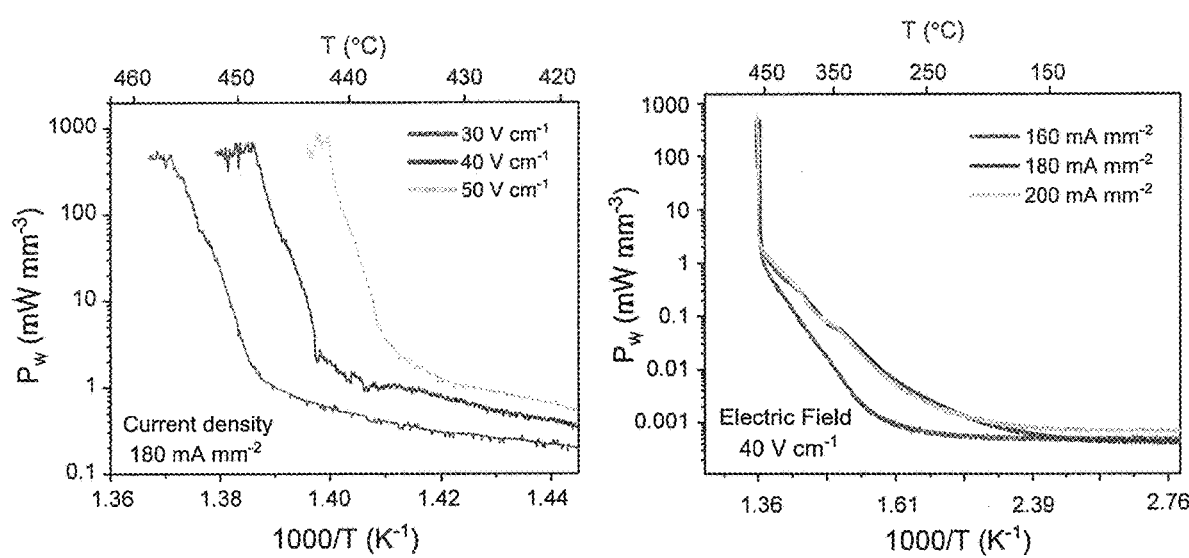
FIG. 2 illustrates power density, measured as the product of the electric field and current density, and expressed in units of mW mm$^{-3}$ plotted versus temperature for materials formed in accordance with at least one embodiment of the disclosure.

The power density, measured as the product of the electric field and current density and expressed in units of mW $mm^{-3}$, plotted versus temperature in Arrhenius plots for t-LLZO during reactive flash sintering, is illustrated in FIG. 2. The rise in power density signals an onset of flash sintering. The end of processing is reached when the current reaches a predetermined set limit, which can be selected based on, for example, for example, the desired density of the end product. The results from Set I are shown on the left of FIG. 2 and those from Set II on the right of FIG. 2. The best densities in the illustrative example, 84% and 85%, were obtained with a field of 40 V $cm^{-1}$ and a current limit of 200 mA $mm^{-2}$.

Figure 3:
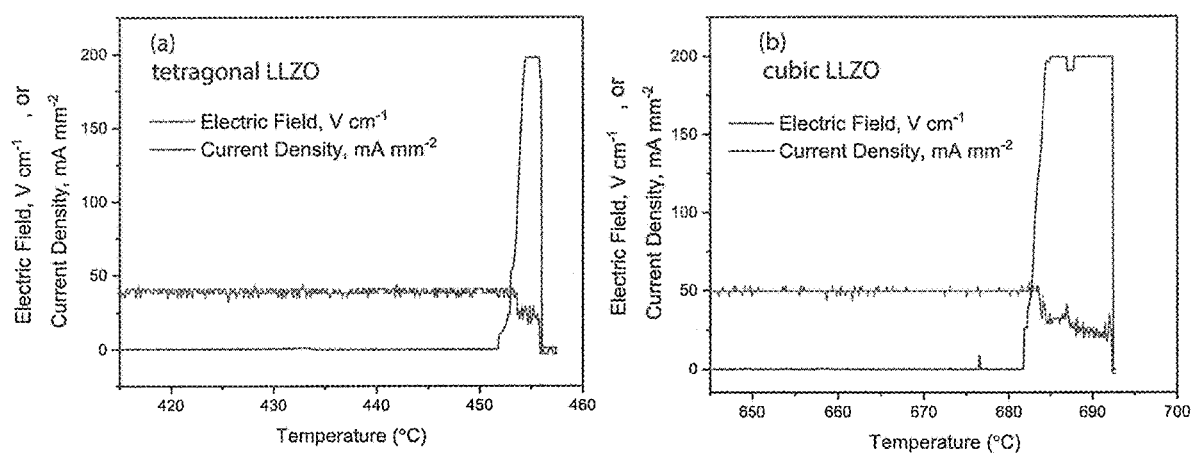
FIG. 3 illustrates current and voltage profiles as the temperature is increased during processing of compounds in accordance with at least one embodiment of the disclosure.

In a similar fashion, constant heating rate processes were conducted for powders containing Al2O3 to synthesize cubic-LLZO. The current and voltage profiles as the temperature increased are illustrated in FIG. 3. Two sets, one at 40 V cm−1 and the other at 50 V cm−1 are included. Note that the onset of the flash is signaled by the abrupt rise in the current and a corresponding drop in the voltage. The power supply was switched to current control when the current density reached 200 mA $mm^{-2}$. Note that the rise in conductivity is more progressive rather than completely abrupt as in the case of basic flash sintering processes with single phase materials, such as yttria stabilized zirconia. This result points to the difference between simple and reactive flash sintering. The different chemistries of powders in reactive flash sintering can cause variability; each elemental (oxide) powder on its own could have a different flash onset. In the powder mixture, the first elemental oxide to flash determines the onset. The pathway for the first flash therefore depends on the packing of the powders of different compositions in the green specimen.

The best density was obtained for 50 V cm−1 and a current limit of 200 mA mm−2. The absolute density of this Al-doped LLZO specimen was 4.4 g cm−3 and its relative density was 86%.

The specimens were characterized by X-ray diffraction in Bruker-D2 Phaser X-ray diffractometer (CuK, 30 kV, 10 mA). The specimens were polished to remove unevenness in the surface and directly taken to the X-Ray machine. These same specimens were also used for electrochemical measurements as described later. After the electrochemical measurements, a specimen was broken and the fracture surface examined by scanning electron microscopy (Hitachi SU3500). The surfaces were coated with 5 nm of gold to prepare for imaging.

Figure 4:
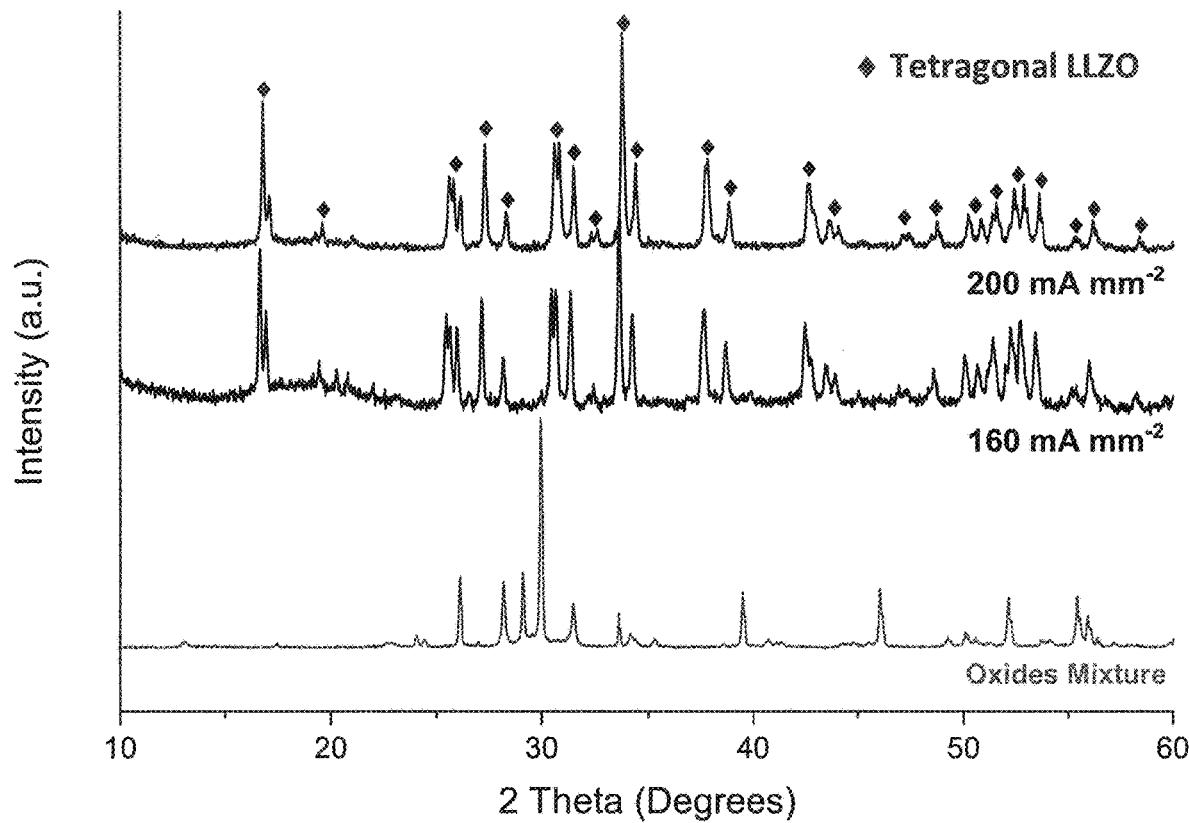
FIG. 4 illustrates a diffraction pattern from flash-sintered tetragonal LLZO in accordance with at least one embodiment of the disclosure.

The diffraction patterns obtained from current limits set at 160 mA mm$^{-2}$ and 200 mA mm$^{-2}$ for the tetragonal LLZO are illustrated in FIG. 4. An observation is that the XRD pattern became more distinct as the current density increased from 160 mAmm−2 to 200 mAmm−2. The diffraction pattern from flash sintering tetragonal LLZO is compared to the handbook pattern in FIG. 4, which illustrates the influence of the current density on the diffraction pattern for tetragonal LLZO. The diffraction data from elemental powders before the flash are shown at the bottom of FIG. 4. These results establish the formation of tetragonal LLZO by the reactive flash sintering process. The pronounced peak doublet (420) is centered at 2θ=30.5 degrees and confirms the formation of the tetragonal phase of LLZO.

Figure 5:
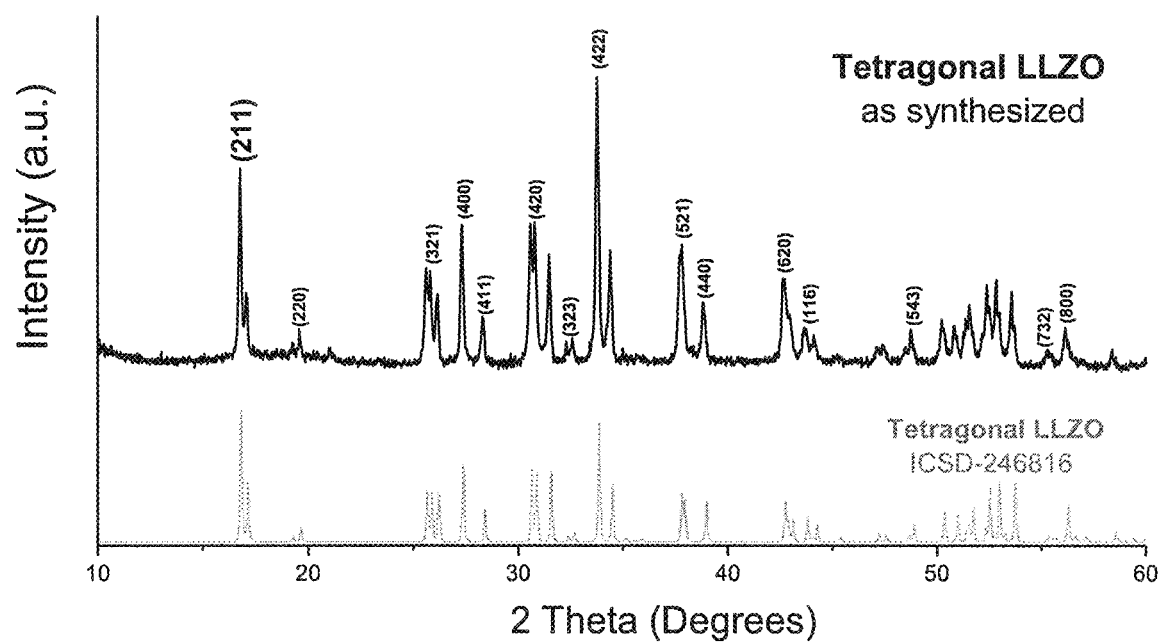
FIG. 5 illustrates an XRD pattern of flash-sintered t-LLZO in accordance with at least one embodiment of the disclosure.
Figure 6:
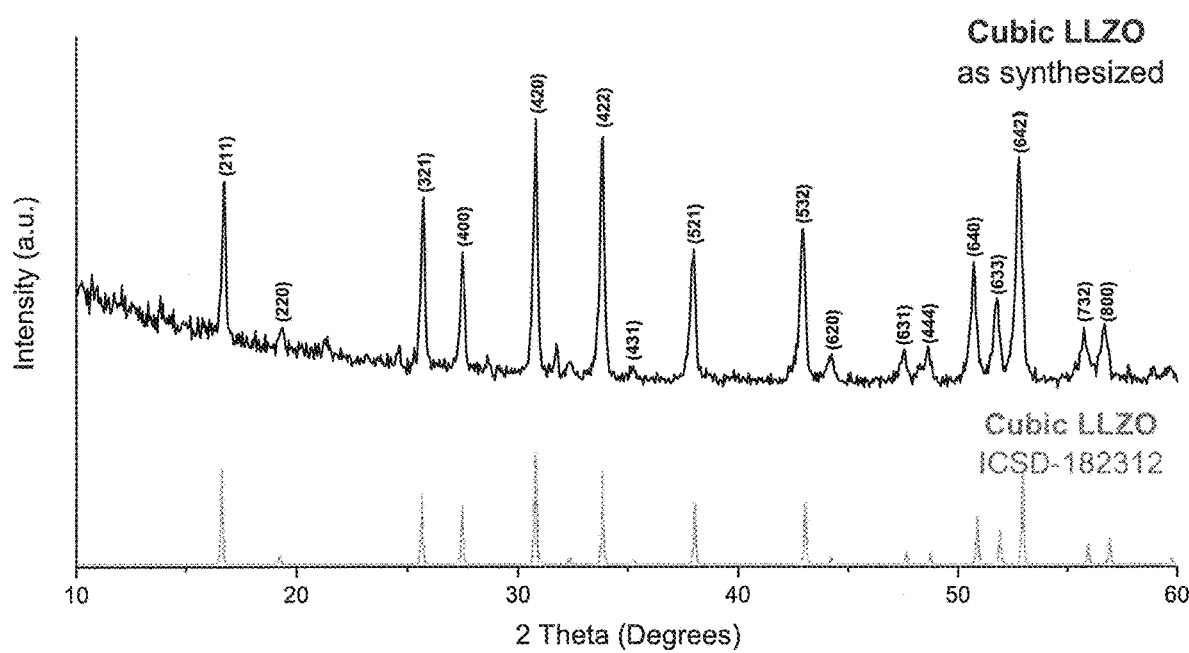
FIG. 6 illustrates an XRD pattern of flash-sintered c-LLZO in accordance with at least one embodiment of the disclosure.

The XRD pattern of flash sintered t-LLZO is compared to the handbook position of peaks in FIG. 5. The XRD pattern of flash sintered c-LLZO is compared to the handbook position of peaks in FIG. 6. The clean X-ray pattern, which matches with a handbook standard, is obtained.

Figure 7:
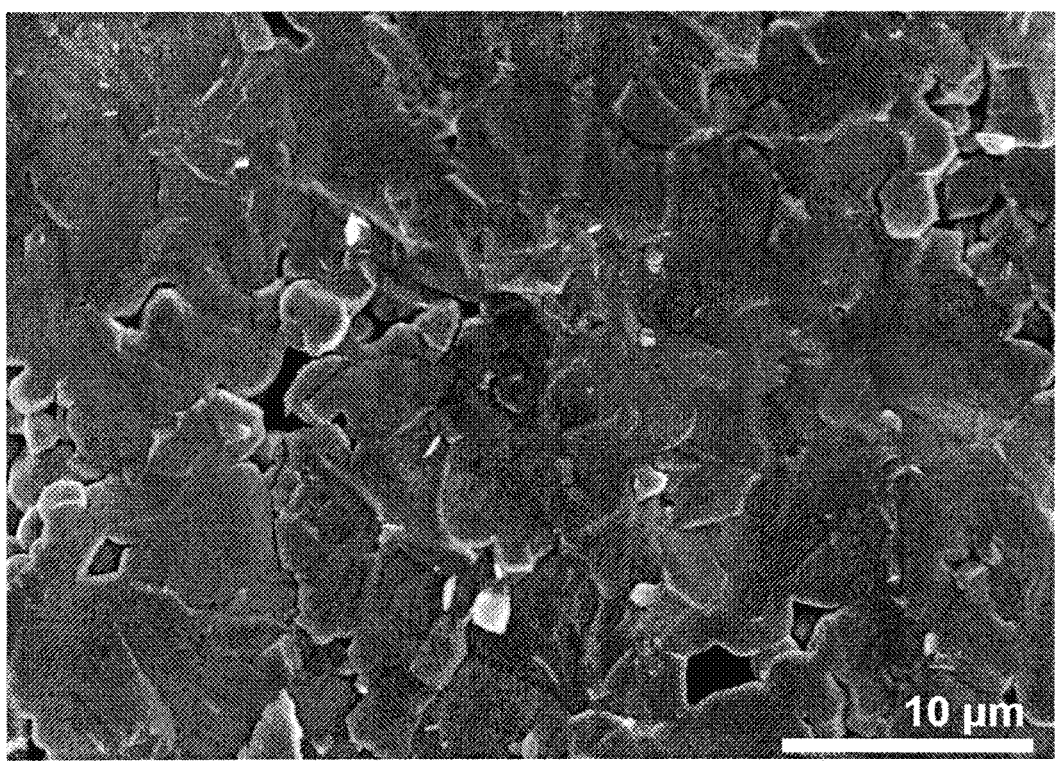
FIG. 7 illustrates a microstructure of a c-LLZO reactive flash sintered sample in accordance with at least one embodiment of the disclosure.
Figure 8:
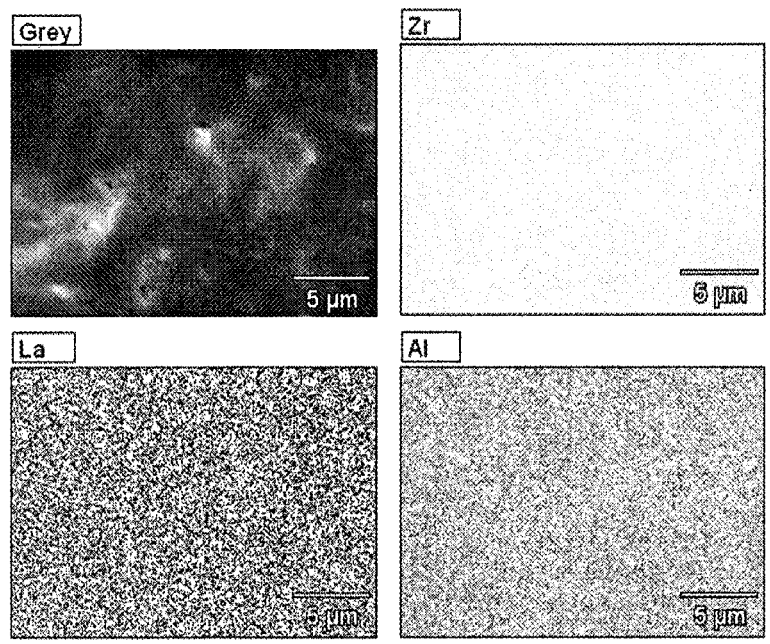
FIG. 8 illustrates EDS mapping of the elements of a sintered compound in accordance with at least one embodiment of the disclosure.

The microstructure of a cubic-LLZO reactive flash sintered sample is given in FIG. 7. The images show a uniform microstructure with predominantly transgranular fracture which indicates good adhesion at grain boundaries. EDS mapping of the elements shown in FIG. 8 illustrates that the Zr, La and Al species are distributed uniformly, which is consistent with the single-phase diffraction pattern.

Figure 9:
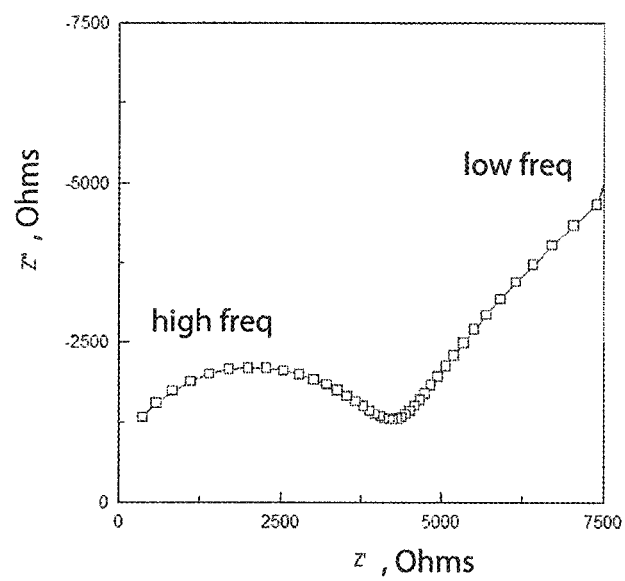
FIG. 9 illustrates a Nyquist plot for the c-LLZO cell in accordance with at least one embodiment of the disclosure.

Half cells of Li|Al-LLZO|Li were prepared by the method that is fully described in Raj R. Analysis of the power density at the onset of flash sintering. Journal of the American Ceramic Society. 2016 October; 99(10):3226-32, which is hereby incorporated herein by reference. The ionic conductivity of the bulk materials was measured by impedance spectroscopy, with a Hewlett Packard 4192A LF, by sweeping the frequency from 13 MHz to 5 Hz with a set voltage of 0.1 V. ionic conductivity values were calculated from the complex impedance plots using ZView software for analysis. FIG. 9 illustrates the Nyquist plot for a c-LLZO cell. The semicircle at the high frequency gives the bulk ionic conductivity, with a resistance of 4500 Ohms, and based on the dimensions of the specimen (4 mm×3 mm×0.82 mm), the bulk ionic conductivity is calculated as 0.15 mScm$^{-1}$.

The examples illustrated above demonstrate that dense stoichiometric polycrystals can be made from mixtures of elemental (oxide) powders including $Al_2O_3$, $Li_2O$, $La_2O_5$, and $ZrO_2$, by the one-step, reactive flash sintering process in air in a few seconds at a furnace temperature 650° C. or less.

The following examples used commercial cubic $Li_{6.25}La_3Zr_2Al_{0.25}O_{12}$ powders (Toshima Manufacturing Co., Ltd., Saitama, JAPAN) with manufacturer specified particle size of 1 μm. The samples were uniaxially pressed into dog-bone specimens having a relative density of ~50%. The gage section had a length of 15 mm and a rectangular cross section of 3.5 mm×~1.0 mm.

Figure 11:
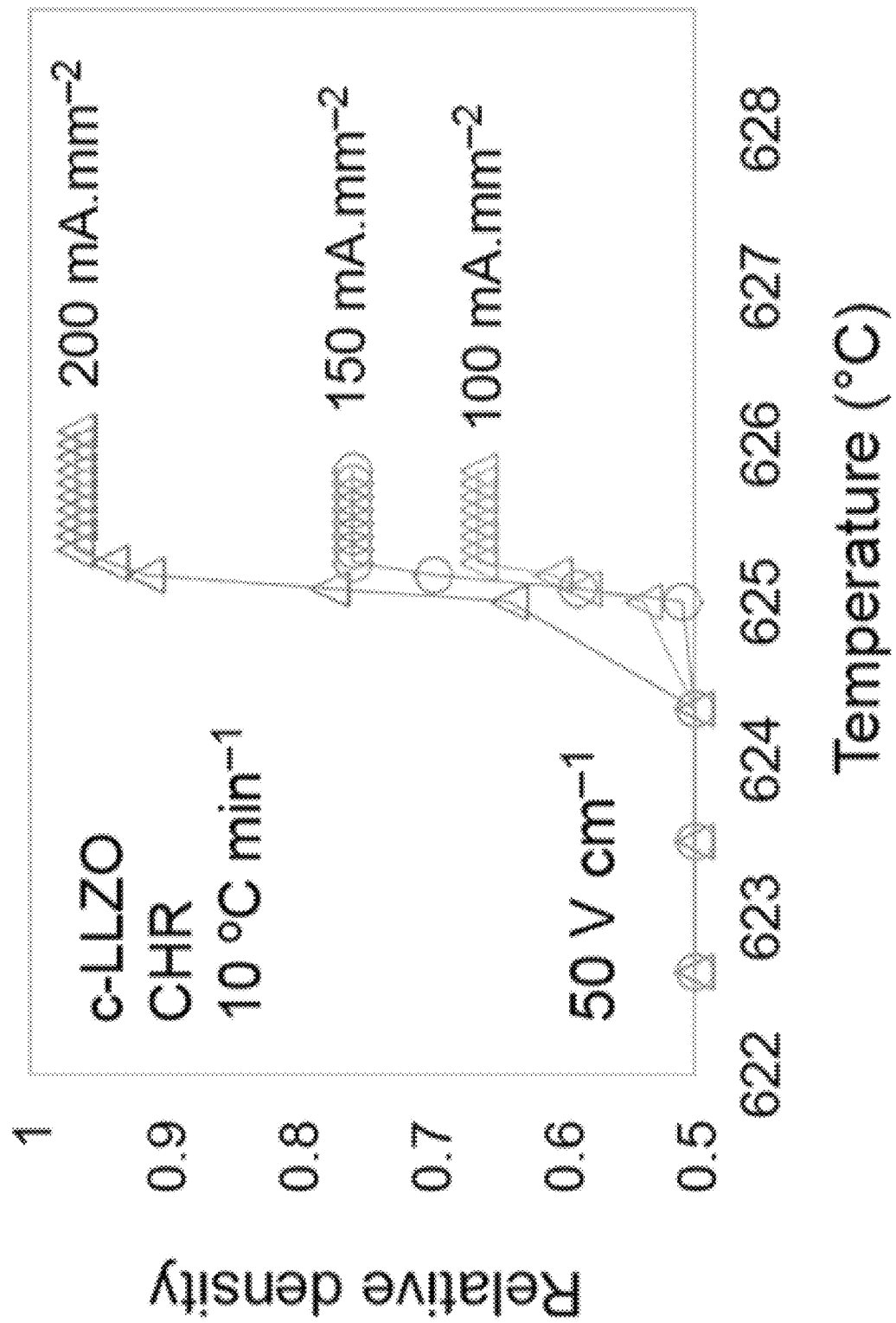
FIG. 11 illustrates onset of flash sintering and the influence of the current density limit on final density in accordance with at least one embodiment of the disclosure.

At first, constant heating rate processes were performed to determine the range of furnace temperature, the field, and the current density limit desired for sintering. While the onset of flash sintering is thought to depend on the electric field and temperature, the extent of densification depends on the current limit. The processes were conducted with an electric field of 50 V cm$^{-1}$. The furnace was heated at a rate of 10° C. min$^{-1}$ from room temperature, up to the point of flash. The processes were repeated at different current densities to determine their influence on the final density. Current density limits of 100, 150 and 200 mA mm$^{-2}$ were employed. The flash onset and the influence of the current density limit on final density are shown in FIG. 11.

The electric field in the above processes was 50 V cm$^{-1}$, which produced a flash at ~625° C. As expected, the final density increased with the current limit. While the density reaches only ~66% at 100 mA mm$^{-2}$, nearly full density is achieved at a current limit of 200 mA mm$^{-2}$. Therefore all further processes were carried out with a current limit of 200 mA mm$^{-2}$.

Figure 12:
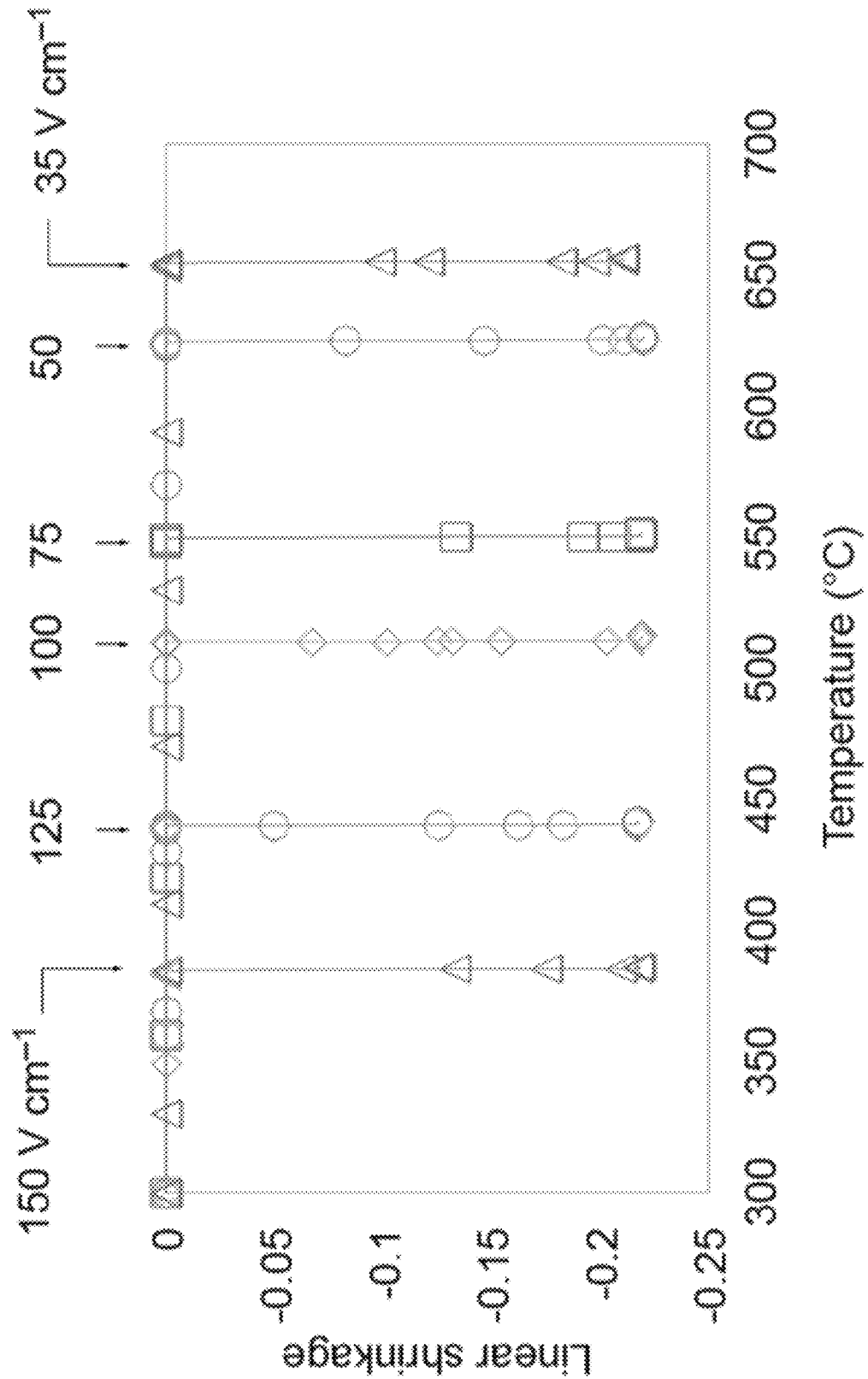
FIG. 12 illustrates linear shrinkage strain of compounds formed in accordance with at least one embodiment of the disclosure.

In the next set of processes the specimens were heated at the rate of 10° C. min$^{-1}$ while the initial field was set in the range 25-150 V cm$^{-1}$. The vertical slopes for the strain represent nearly instantaneous shrinkage. The transition temperature falls as the field is increased eventually dropping to 385° C. at 150 V cm$^{-1}$. The current limit for the examples below was set at 200 mA mm$^{-2}$. The results for linear shrinkage strain are shown in FIG. 12. The shrinkage strain for the samples of these examples was 0.22, which according to Eq. (2), translates into a final density of 97% with the green density, $\rho_g$=0.5. Examination of the fracture surfaces in the SEM showed the grain size to increase at higher fields. For example it increased from ~2 μm at 50 V cm$^{-1}$ to 5 μm at 100 V cm$^{-1}$.

Figure 13:
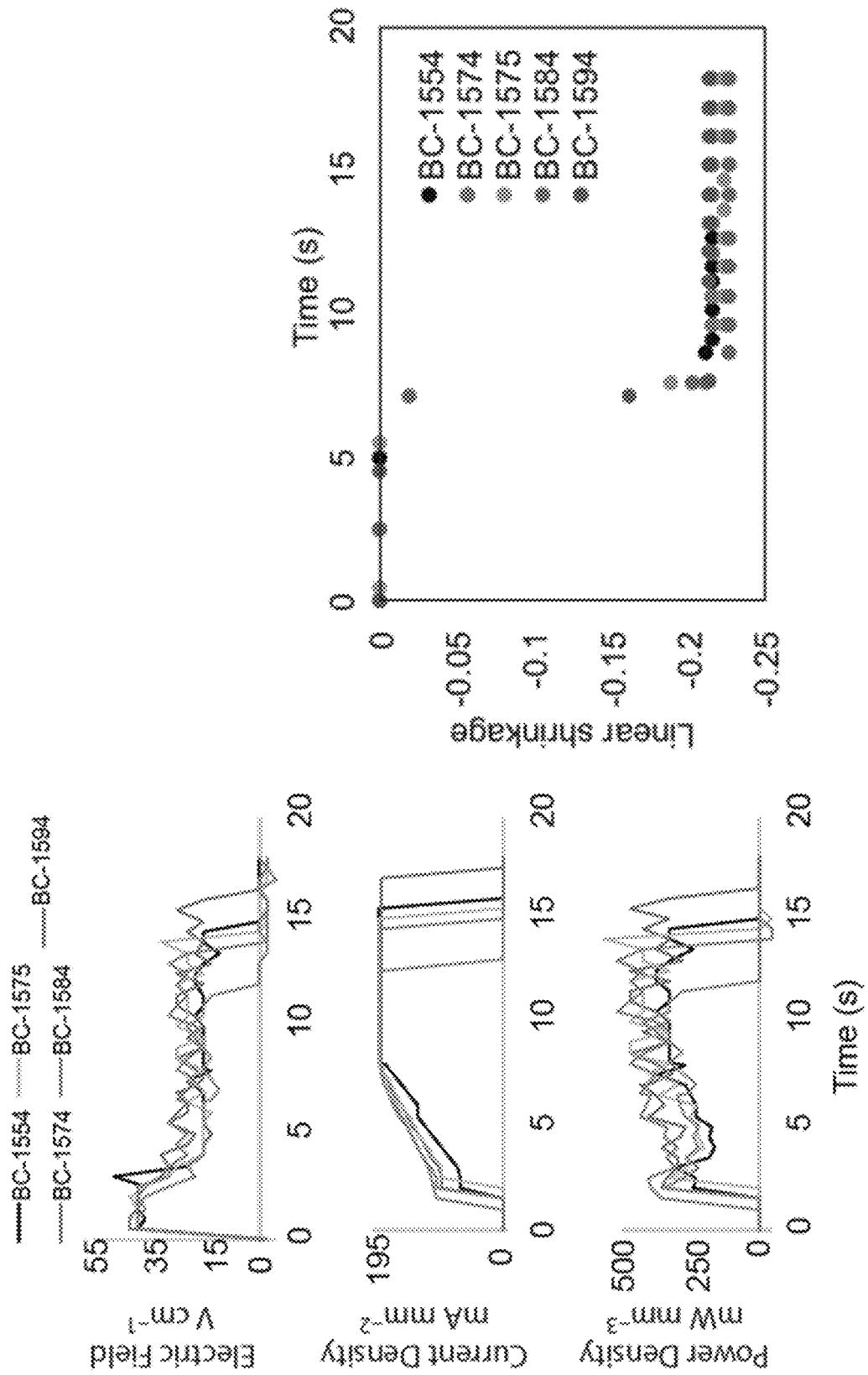
FIG. 13 illustrates electric field, the current density, and the power density curves during the flash sintering as are plotted as a function of time in accordance with at least one embodiment of the disclosure.

Next, isothermal flash sintering processes were carried out with a field of 50 V cm$^{-1}$. A higher furnace temperature than measured in the constant heating rate processes improved the microstructure and the mechanical strength of the sintered specimen, which was needed to cut and polish the specimens for electrochemical measurements. For this reason, the next samples were all flash sintered at 850° C., under an electric field of 50 V cm−1, and with a current density limit of 200 mAmm−2. The electric field, the current density, and the power density curves during the flash sintering processes are plotted as a function of time in FIG. 13. The right side of the figure gives the shrinkage at the onset of the flash. The final density from these specimens, more than forty of them, was ~97% as calculated by inserting the green density of ~50% and a linear shrinkage of −0.22 in Eq. (2).

The crystal structure of the flash sintered specimens was characterized by X-ray diffraction, the microstructure by scanning electron microscopy, and the fracture toughness and hardness as measured by the microindentation method.

The chemical composition of the LLZO powder measured after flash sintering (with a total weight of 1.4 g) is given in Table 2.

The XRD pattern confirms the garnet like structure with cubic symmetry after the flash sintering process without indicating any additional diffraction lines from the tetragonal phase, for example. The micrograph is consistent with the high density measured from linear shrinkage. It shows transgranular fracture, which reflects strong cohesion at grain boundaries. The fracture toughness was measured by microhardness technique where the diagonal length of the Vickers indentation, d, at and applied load, P, gives the hardness, H.

$$H = \frac{1.8544P}{d^2} \quad (3)$$

And, the fracture toughness, $K_{IC}$, is given by the length of the microcracks emanating from the indentation, $C_o$, and the elastic modulus E=150 GPa as, $$K_{IC} = \xi \left(\frac{E}{H}\right)^{0.5} \frac{P}{c_0^{1.5}} \quad (4)$$

where $\xi$ is a material-independent constant (0.016). The measured values are in good agreement with literature values.

The chemical composition of the as received powders and from flash sintered samples is given in Table 2 below. The difference between the values most likely lies in the chemical analysis. The as received powder was analyzed by the supplier in Japan, while the after-flash specimens were analyzed by Galbraith, a laboratory in the US. The total weight of the after-flash specimen was 1.4 g which was obtained by adding three flash specimens.

TABLE 2

| | All values are in wt % | | | | |
|---|---|---|---|---|---|
| | Al | Li | La | Zr | O | Total |
| As received | 2.3 | 5.0 | 48.1 | 21.0 | 23.65 | 100 |
| After Flash | 4.6 | 5.1 | 47.0 | 18.8 | 24.6 | 100 |

Symmetrical Li|LLZO|Li cells were fabricated from gage sections of the flash sintered dog-bone samples, which was cut into rectangular shapes with a surface area of 10±2 mm². These rectangles were polished down to a thickness of 0.5-0.8 mm range using a manual grinder (M-Prep 5; Allied High Tech Products, Rancho Dominguez, Calif.), 15 and 6-micron diamond metal plated discs, and eventually 3, 1, and 0.25-micron diamond lapping films (Allied High Tech Products, Rancho Dominguez, Calif.). The polishing was carried out in air.

The cells were assembled inside an argon-filled glove box with less than 0.25 ppm of oxygen. First, 0.6-mm-thick lithium chips (MTI Corporation, CA) were rolled to a thickness of 0.25 mm to expose a fresh surface. The lithium chips were then cut to rectangular shapes in order to fit the dimensions of the LLZO, and were manually placed on both polished faces of the LLZO. The Li-LLZO-Li sandwich was rolled to promote initial electrodes-electrolyte bonding, and then diffusion bonded at ~150° C., which is 0.7 of the lithium melting point, for 30 min under a 10 kg load. The final thickness of the lithium electrodes, estimated with calipers, was 40-70 µm each on both sides of the LLZO. The excess lithium was cut with a razor blade and the sides of the cell were masked with an isolating paint in order to avoid any lithium leakage. Finally, the Li-LLZO-Li cells were placed inside Swagelok-type cells. The cells were tested in air for their electrochemical properties.

The intrinsic lithium-ion conductivity of the flash sintered LLZO and the interfacial resistance between the LLZO and the lithium electrodes were measured with an impedance analyzer (4192A LF impedance analyzer; HP, Palo Alto, Calif.) in the frequency range of 5 Hz to 10 MHz with a voltage amplitude at 0.1 V. Zview software was employed for data analysis and presentation of the impedance spectrum.

Constant direct current (DC) processes were performed using a multichannel Arbin programmed by MITS Pro software. The results are presented by plotting the applied current density and the voltage response versus time. An environmental chamber from Espec was employed for temperature dependence tests.

The conductivity values were calculated from $$\sigma = \frac{L}{R \cdot A} \quad (5)$$

where $\sigma$ (S cm$^{-1}$) is the specific conductivity, R (Ohms) is the resistance, L (cm) is the thickness of the ceramic specimen, and A (cm²) is the electrode surface area. The area specific resistances (ASR) were calculated from ASR=RA in units of Ohm cm². The activation energy was calculated by the Arrhenius equation:

$$\sigma T = B \exp\left(-\frac{E_a}{k_B T}\right) \quad (7)$$

where B is the pre-exponential factor, $E_a$ (J atom$^{-1}$) is the activation energy, $k_B$ is the Boltzmann constant, and T is the absolute temperature (K).

The physical transport of the lithium layer Li from the anode to the cathode was measured directly by X-ray Computed Tomography. The non-destructive nature of this measurement allowed us to measure the change in the thickness of the Li metal layer on either side before and after the electrochemical charge transport. In these processes the current was run until the exhaustion of the metal was seen by a rise in the potential. The electron charge transport was measured (per unit area) and converted into Li metal layer thickness, which was then compared with the measurement from X-ray tomography. Because lithium is not clearly visible with X-ray tomography, copper foils were added on both sides of the Li-LLZO-Li cells and the lithium thickness was estimated from the distance between the copper foils and the LLZO. This Cu—Li-LLZO-Li—Cu configuration also helped to protect the cell from oxidizing in air during the tomography measurements.

Figure 14:
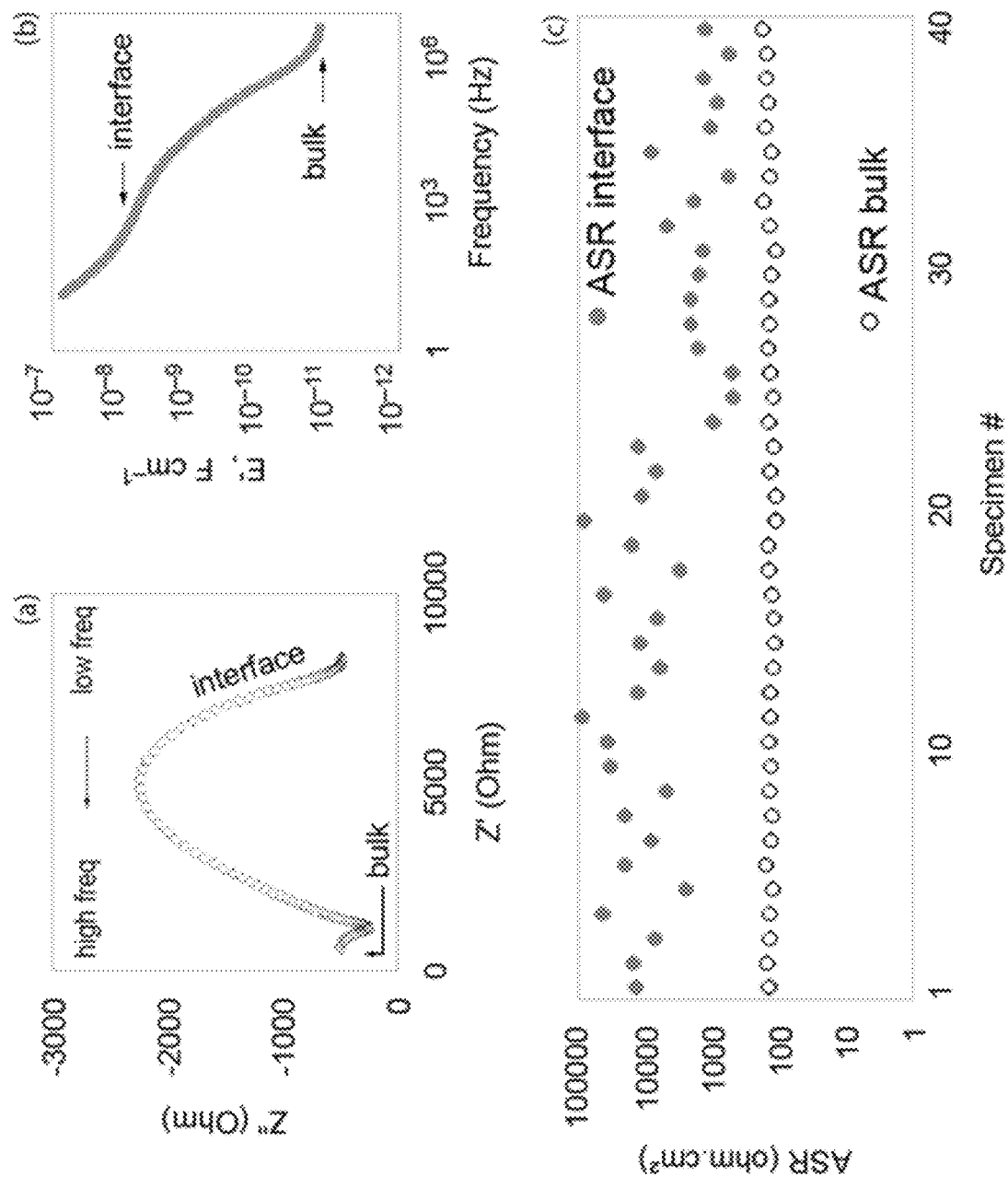
FIG. 14 illustrates AC impedance measurements for compounds formed in accordance with at least one embodiment of the disclosure.

The results from AC impedance measurements for forty specimens are summarized in FIG. 14. Typical impedance spectra are shown in the upper half of the figure; these were used to determine the bulk ionic ASR and the interface ASR (note that the interface ASR is the sum of two interfaces on either side of the cell, so that the ASR for a single interface would be half of these values). The results for forty specimens are shown in the lower plot. Note that while the bulk ASR is highly reproducible, 130 Ohm cm$^2$, the interface ASR can vary from being ten times to one hundred times greater. Therefore the DC cell resistance is dominated by the interfaces. The variability in the measurements of critical current density may be attributed to the variability in the interface resistance.

The bulk ASR values normalized with the electrode area and the electrolyte thickness give the specific conductivity of 0.5 mS cm$^{-1}$. The interface ASR values, which lie in the 500-100,000 Ohm cm$^2$ range, are similar to the literature values, which vary from 37 to 20,000 cm$^2$. The variability in the interfacial ASR is thought to be attributed to the formation of lithium oxide and the possibility of pores at the surface left behind by the outward migration of lithium to form lithium oxide from exposure to air.

The capacitance plateaus corresponding to the bulk and the interface components are shown on the top right in FIG. 14. The higher capacitance of the interface arises from its narrow width. The bulk values are lower because they are related to the thickness of the electrolyte.

The activation energy for the bulk conductivity ($E_a$) was determined by measuring the specific conductivity as a function of temperature. The results range for the activation energy, measured with four specimens, was 0.33-0.40 eV.

The DC response of the Li|LLZO|Li cells was measured by driving current through the cell and measuring the voltage generated across it. The current density was varied from 0.1-1.0 mA cm$^{-2}$. Failure was recorded by a short circuit in the voltage after a period of time of current injection. Two types of measurements were performed. In one case, the lifetime of the cells was measured as a function of the current density. These results are given in FIG. 15. The critical current density of CCD is the highest current tolerated by the cell before shorting.

Figure 15:
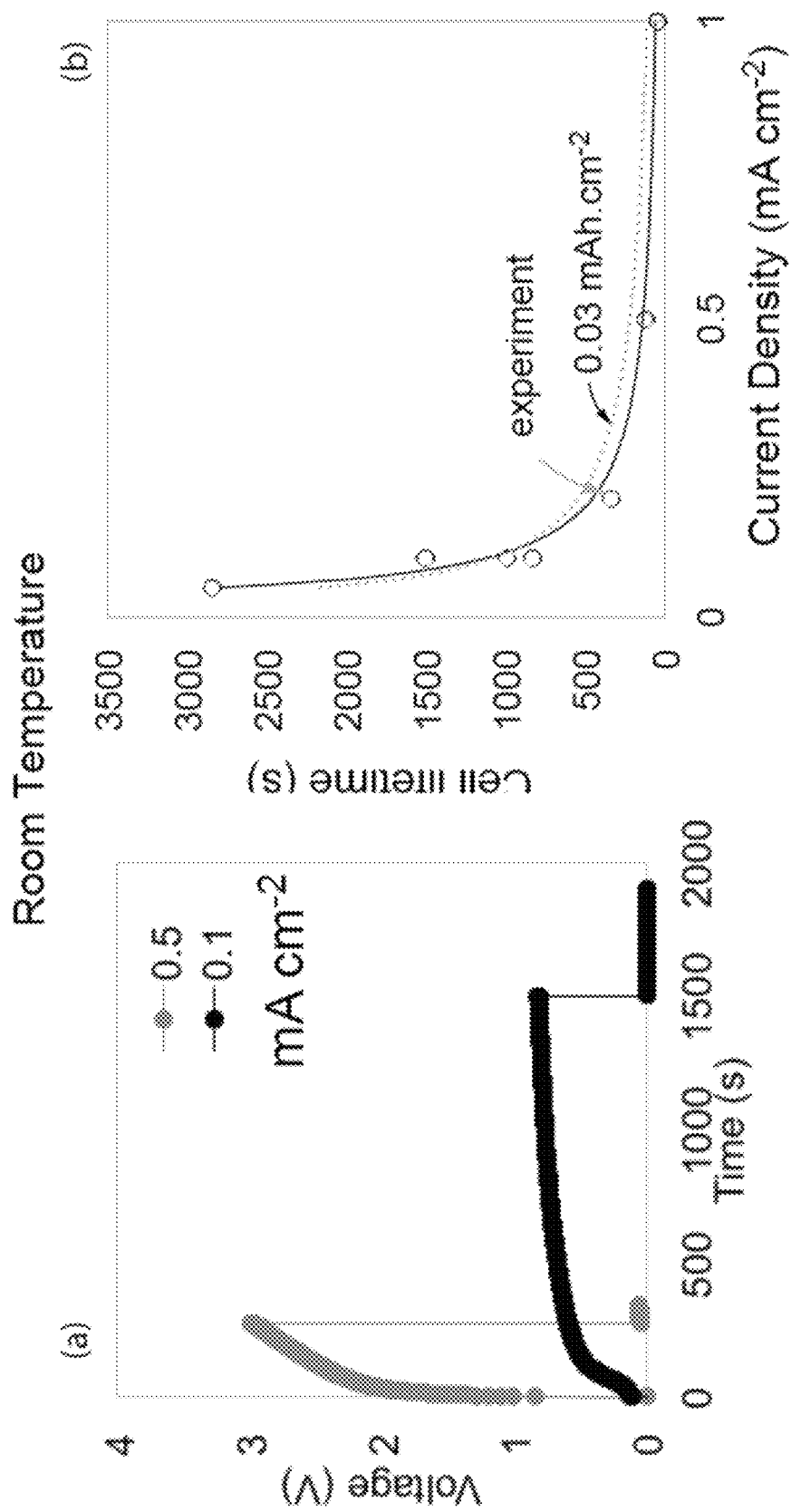
FIG. 15 illustrates lifetime of the cells as measured as a function of the current density in accordance with at least one embodiment of the disclosure.

The time to failure for two current densities, 0.1 and 0.5 mA cm−2, at room temperature, is given on the left in FIG. 15. These curves show that the cell voltage rises with time quickly at first but then more slowly. Eventually the cell fails. The voltage short at 0.5 mA cm−2 occurred at 278 s, which is of the same magnitude as reported in the literature (~300 s at 0.5 mA cm−2. The cell life increased to ~25 min at 0.1 mA cm−2. It is noted that the overall resistance of these cells was likely dominated by the contact resistance, which in these cases was ~1500 Ωcm2. Therefore, the short occurs first across the interface but then propagates through the electrolyte.

The data for cells tested over a wide range of current densities are shown on the right hand side in FIG. 15. It is interesting that the total charge transport which is the product of the current density and the time to failure remains essentially constant irrespective of the current density, at 0.03 mAh·cm−2. It may suggest that the interface capacitor continues to charge until it reached a certain value of the potential difference and then it suffers electric breakdown leading to failure.

Figure 16:
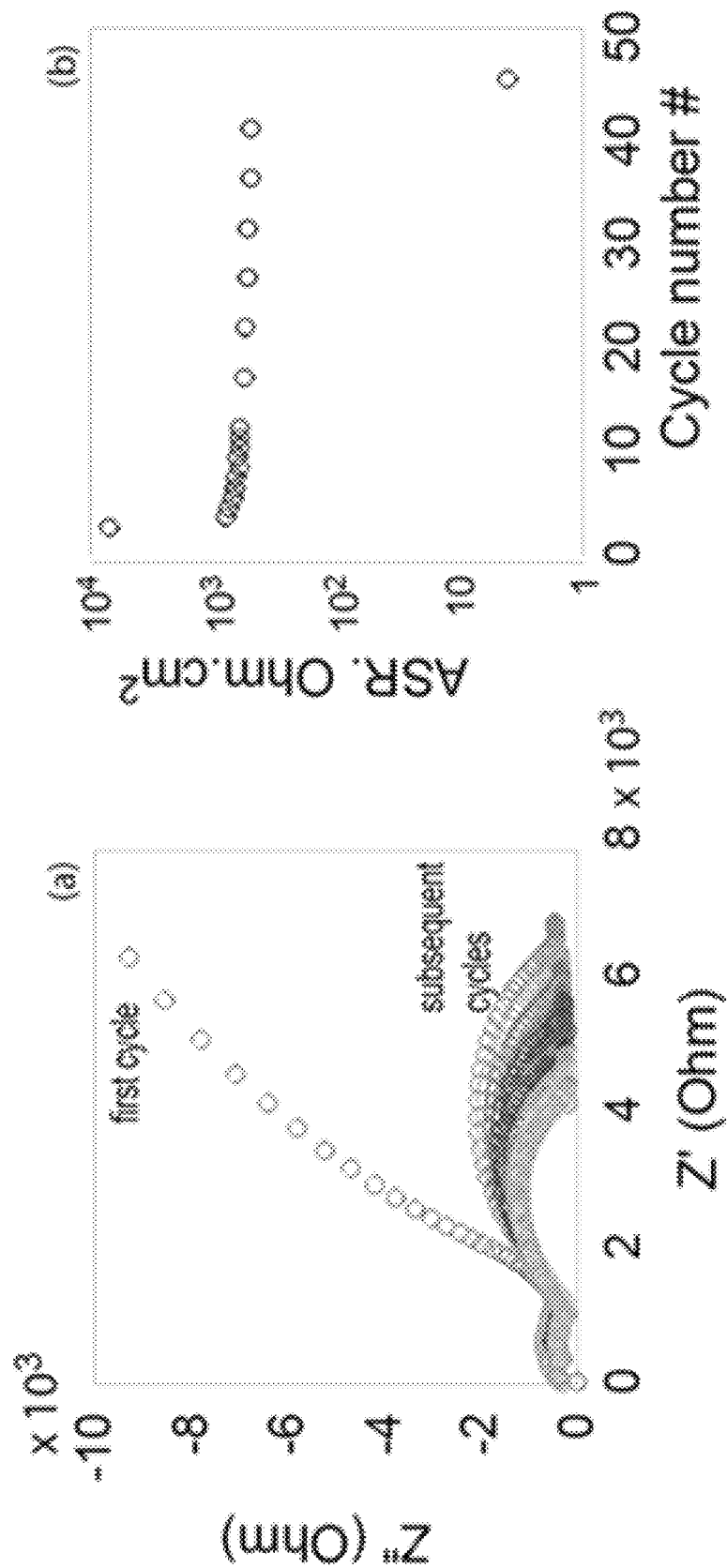
FIG. 16 illustrates impedance spectra and the corresponding ASR values for the interface as a function of cycle number in accordance with at least one embodiment of the disclosure.

The shape of the polarization curves in FIG. 15 suggest that the interface resistance drops as current continues to flow across it. Therefore we attempted to reduce the interfacial resistance by applying short DC cycles at low currents. Here, a Li|LLZO|Li cell, with an initial interfacial ASR of ~7 kΩ·cm2, was cycled at ±0.1 mA·cm−2 with 1 min dwell time. Impedance measurements were performed after each DC cycle for the first ten cycles, and then every five cycles. The impedance spectra and the corresponding ASR values for the interface as a function of cycle number are shown in FIG. 16. Interestingly, the interfacial ASR, which initially had a value of 7,000 Ωcm$^2$, dropped to 800 Ωcm$^2$ after the first cycle, and then stabilized at ~500 Ωcm$^2$ for several cycles, until the final short-circuit at the 45th cycle. In the meantime, the bulk resistance of the LLZO represented by a semicircle at high frequency, remained constant until the final short-circuit. Several processes showed similar behavior, that is, a drop in interfacial ASR after the first cycle down to 500-1500 Ωcm2, followed by stable behavior until a short-circuit. It is thought that cycling the cell at low currents helps to reduce the interfacial layer resistance to a minimum of 500 Ωcm2; however this may still not be low enough to avoid failure.

Figure 17:
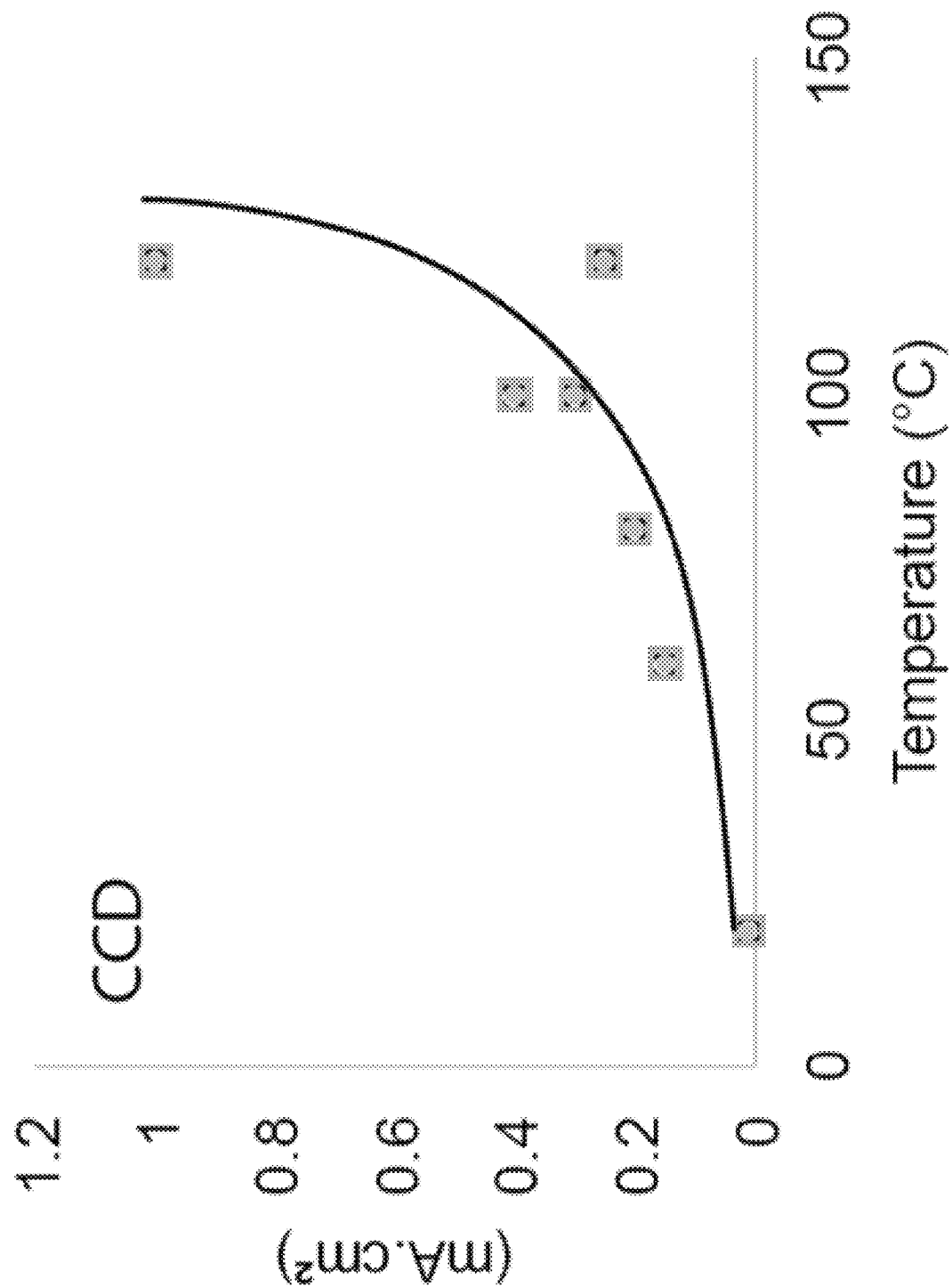
FIG. 17 illustrates measurements of the CCD as a function of the cell temperature in accordance with at least one embodiment of the disclosure.

The critical current density (CCD) defines the charge or discharge rate limit for a battery. We measured CCD by a stepwise increase in the current density starting from 0.05 mA·cm$^2$ with 4 min dwell times. The current density when the voltage dropped to indicate a short, was defined as the CCD. This process was performed at different temperatures from 20° C. to 120° C. Measurements of the CCD as a function of the cell temperature are shown in FIG. 17. There is a non-linear rise in CCD with temperature, which reaches 1 mA cm$^{-2}$ at 120° C.

Figure 18:
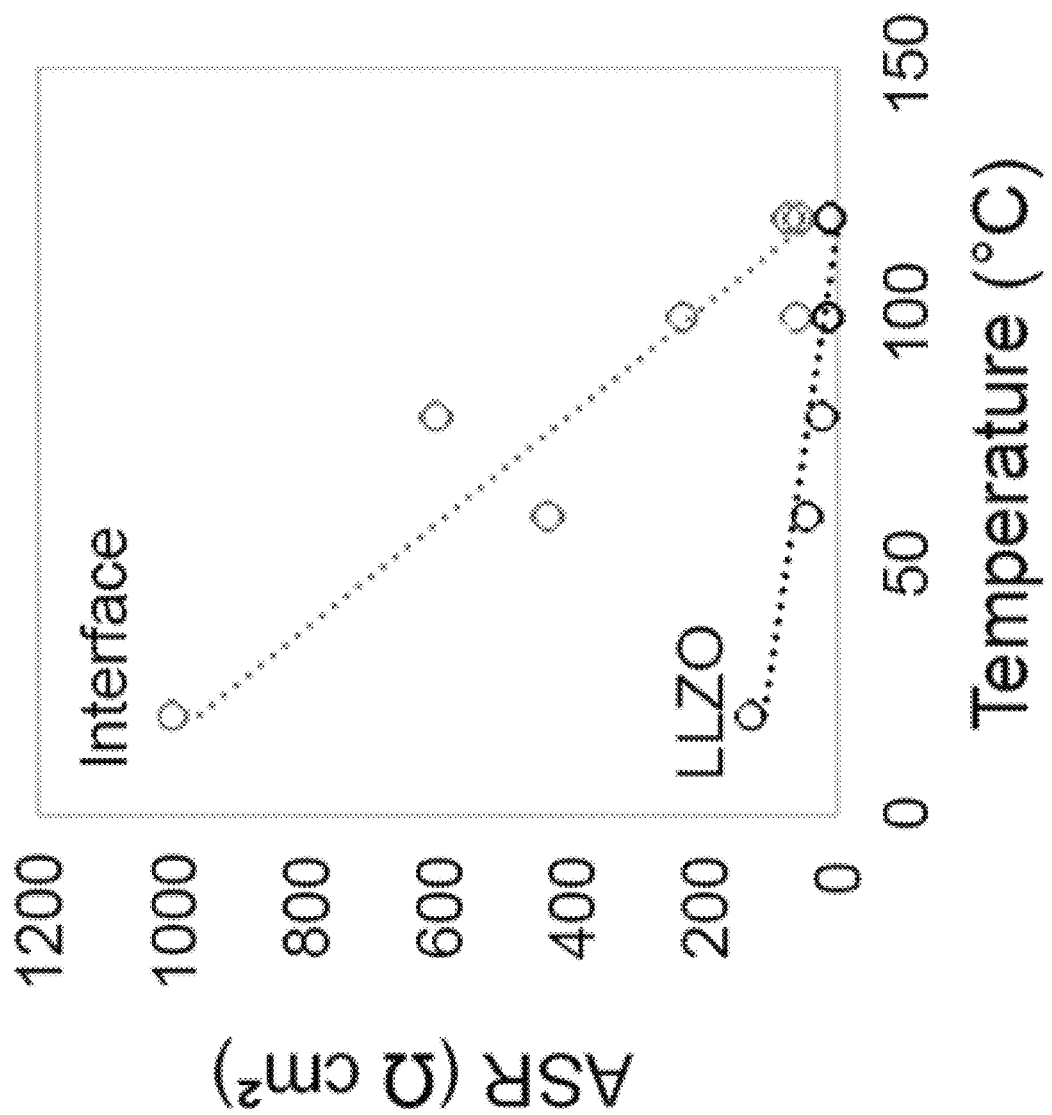
FIG. 18 illustrates relative change in the interface and bulk ASRs with temperature in accordance with at least one embodiment of the disclosure.

Since the interface dominates the overall resistance of the cell, we were interested to see whether the relative change in the interface and bulk ASRs, with temperature, may have been the underlying cause for higher CCD at higher temperature. The two values are compared in FIG. 18. Note that the two values converge as the temperature approaches 120° C. These results taken as a whole suggest that the CCD can be determined by the interface ASR. A possible mechanism is that the higher resistance produces a larger electric field across the interface causing an electrical breakdown which then propagates through the electrolyte. An alternative suggestion is that the interface capacitor continues to develop charge until the potential across it reaches the breakdown field for the dielectric.

There is nearly always a concern if the charge transport through the electrolyte is ionic, or electronic or mixed ionic and electronic. While the activation energy provides some degree of guidance, it varies widely from 0.25-0.40 eV, and there is a chance that the lower end of these values may signal a mixed electronic and ionic conductivity. The definite way to determine whether or not the transport is ionic is to measure the charge moved across the electrolyte and compare that with physical transport of Li across from one side to the other. We have measured the thickness of the transport of Li layer at 100° C. with X-ray tomography. Since this is a non-destructive method, it was possible to measure the thickness of the Li layers on both sides before, and then, again, after electrochemical transport of Li.

For this purpose a Cu|Li|LLZO|Li|Cu cell was constructed. The distance between the copper layer and the LLZO interface gave a measure of the Li layer (by itself Li did not have enough contrast). The results of the electrochemical response were scanned by X-ray Computing Tomography before and after the DC test in order to get a direct metallographic evidence of lithium transfer. We sought a one to one correspondence between the charge transported and the physical thickness of the Li metal moved from one electrode to the other. The thickness of the lithium layer transported during DC processes is given by the following equation:

$$\Delta_{Li}(\mu m) = J(mA\ cm^{-2}) * t(h) * 4.85 \qquad (8)$$

which implies that 4.85 μm of Li-metal layer is transported in 1 h at a current density of 1 mA cm$^{-2}$.

Figure 19:
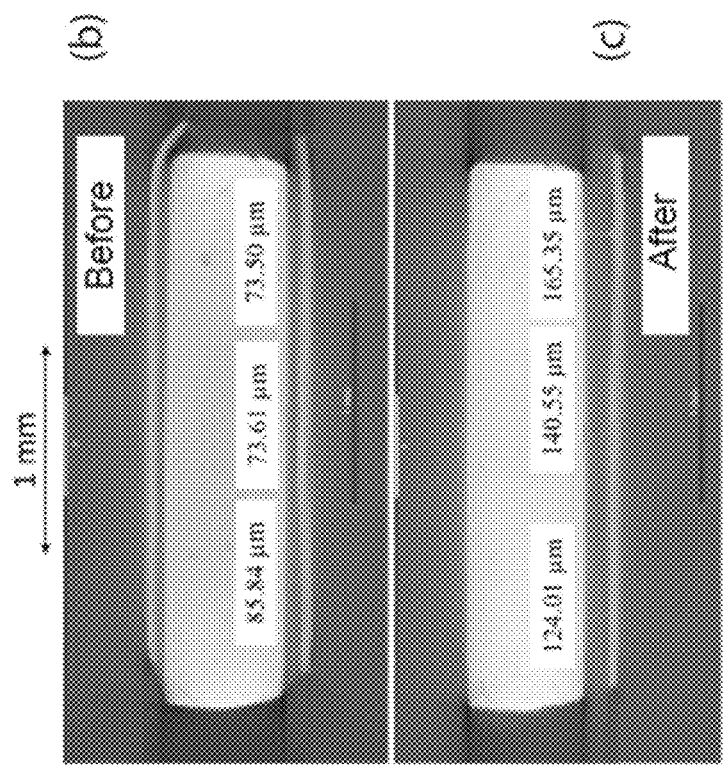
FIG. 19 illustrates current time and X-ray tomography micrographs of the cell before charging and as exhausted in accordance with at least one embodiment of the disclosure.
Figure 19:
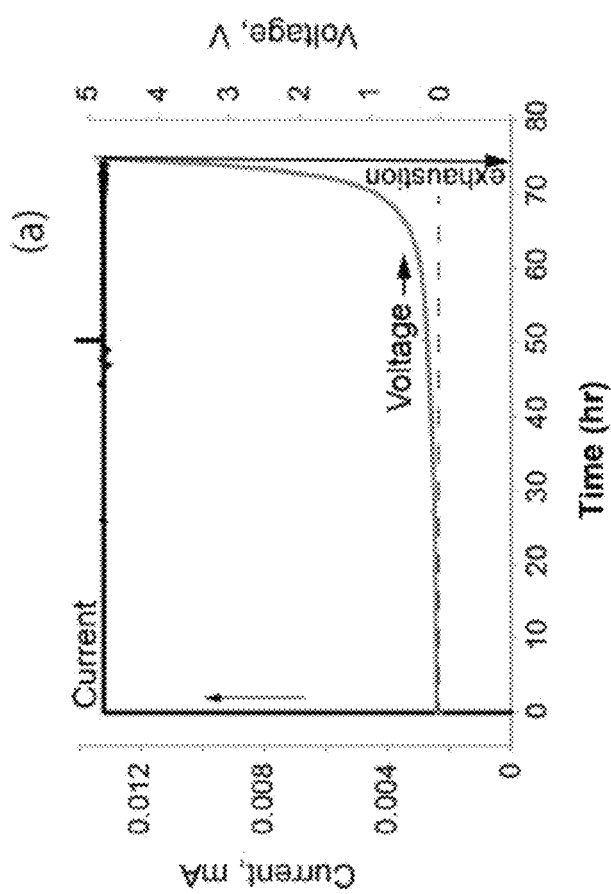

The X-ray tomography micrograph of the cell before charging is shown on the top right in FIG. 19. The thickness of the Li layer at the bottom electrode at three locations is measured to be 85.84 μm, 73.61 μm and 73.50 μm. The cell was run to exhaustion at a current density of 0.1 mA cm$^{-2}$ at 100° C., the exhaustion being signaled by a rise in the voltage. The X-ray tomograph of the "exhausted" cell is shown on the bottom right. The Li layer on the upper electrode is now absent, while at the lower electrode it has thickened to 124.01 μm, 140.55 μm and 165.31 μm at the same locations as before electrochemical charging. Thus a thickness of the Li layer has increased by 38.17 μm, 66.94 μm and 91.81 μm at these three locations. The exhaustion occurred after ~72 hrs under 0.1 mA·cm$^{-2}$, which corresponds to a charge throughput of ~7.2 mAh·cm$^{-2}$. According to Eq. 8, this predicts a Li layer transport of 35 μm, which seems to be somewhat lower than the values measured in the tomograph. Of course the charge transport cannot be less than the physical transport of lithium metal by ionic transport across the electrolyte. These results point to a highly non-uniform charge transport across the interface arising from spatial variability in the interfacial resistance.

The results above shown that 97% dense cubic-LLZO can be prepared by flash sintering of stoichiometric powders, and these microstructures have good grain boundary cohesion. The flash process was carried out with a furnace temperature of 850° C., an electric field of 50 V cm−1 and current limit of 200 mA mm−2. The entire sintering process was completed in a few (e.g., less than ten, less than 8, or about 1 to about 10, or about 2 to about 8, or about 1 to 5) seconds, in air atmosphere.

Electrochemical measurements of interface and electrolyte ASR values show that the total ASR is controlled by the interface. The CCD values measured as a function of temperature suggest that the interface resistance is the primary source of electrical failure. As the temperature of the cell is increased, the interface resistance falls more quickly than the bulk resistance, and converges to nearly equal value at 120° C.

It is proposed that the dominance of interface resistance in the failure process arises from dielectric breakdown of the high field that develops across it (the field is a product of interface ASR and the current density divided by the effective thickness of the interface which may be as small as a few nanometers). The short across the interface then propagates through the electrolyte. At higher temperatures the lower interface resistance makes this mode of failure less likely, thereby increasing the values for the CCD.

Although exemplary embodiments of the present disclosure are set forth herein, it should be appreciated that the disclosure is not so limited. For example, although exemplary sintered compounds are described in connection with various specific starting compounds, the disclosure is not necessarily limited to these examples. Various modifications, variations, and enhancements of the methods set forth herein may be made without departing from the spirit and scope of the present disclosure.

The subject matter of the present disclosure includes all novel and nonobvious combinations and subcombinations of the various systems, components, and configurations, and other features, functions, acts, and/or properties disclosed herein, as well as any and all equivalents thereof.

We claim:

1. A method of forming a sintered compound, the method comprising the steps of:
   providing a first compound comprising a first chemical composition;
   providing a second compound comprising a second chemical composition;
   providing a third compound comprising a third chemical composition; and
   flash sintering the first compound, the second compound, and the third compound in an atmosphere to form a single-phase sintered compound,
   wherein a duration of the step of flash sintering is less than ten seconds; and
   wherein the step of flash sintering comprises applying a voltage and switching to current control upon the incidence of flash.

2. The method of claim 1, further comprising providing a dopant selected from the group oxides of transition metals and oxides of rare earth metals.

3. The method of claim 1, wherein at least one of the first compound, the second compound, and the third compound comprises a metal oxide.

4. The method of claim 3, wherein each of the first compound, the second compound, and the third compound comprises a metal oxide.

5. The method of claim 1, wherein the first compound comprises lithium oxide.

6. The method of claim 1, wherein the second compound comprises lanthanum oxide.

7. The method of claim 1, wherein the third compound comprises zirconium oxide.

8. The method of claim 1, wherein the sintered compound comprises lithium lanthanum zirconium oxide.

9. The method of claim 1, wherein at least one of the first compound, the second compound, and the third compound comprises lithium; at least one of the first compound, the second compound, and the third compound comprises lanthanum; and at least one of the first compound, the second compound, and the third compound comprises zirconium.

10. A method of forming a solid-state electrolyte, the method comprising the steps of:
    providing a mixture comprising a first compound comprising a first chemical composition and a second compound comprising a second chemical composition;
    flash sintering the mixture in an air atmosphere to form a single-phase sintered compound;
    wherein the sintered compound is a solid-state electrolyte material;
    wherein a duration of the step of flash sintering is less than ten seconds; and
    wherein the step of flash sintering comprises applying a voltage and switching to current control upon the incidence of flash.

11. The method of claim 10, wherein the mixture further comprises a third compound comprising a third chemical composition.

12. The method of claim 11, wherein at least one of the first compound, the second compound, and the third compound comprises a metal oxide.

13. The method of claim 11, wherein at least one of the first compound, the second compound, and the third compound comprises lithium; at least one of the first compound, the second compound, and the third compound comprises lanthanum; and at least one of the first compound, the second compound, and the third compound comprises zirconium.

14. The method of claim 10, wherein the sintered compound comprises $Li_7La_3Zr_2O_{12}$.

15. The method of claim 14, wherein the sintered compound comprises cubic $Li_7La_3Zr_2O_{12}$.

16. The method of claim 14, wherein the sintered compound comprises tetragonal $Li_7La_3Zr_2O_{12}$.

17. The method of claim 10, wherein a temperature during the step of flash sintering is less than about 650° C.

* * * * *